Dec. 12, 1950                    J. P. QUAM                    2,533,688
                               FOCUSING DEVICE
Filed Jan. 31, 1950                                         2 Sheets-Sheet 2
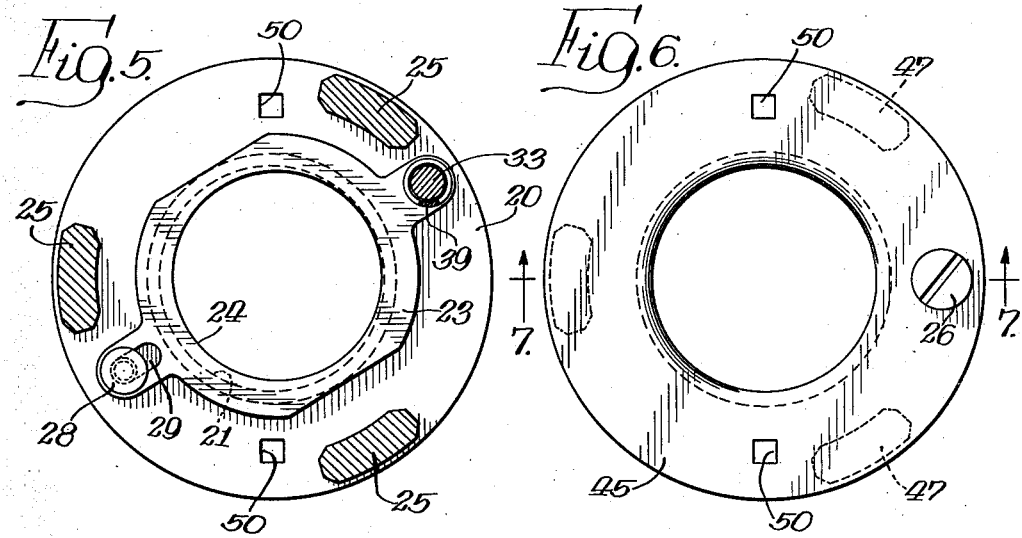
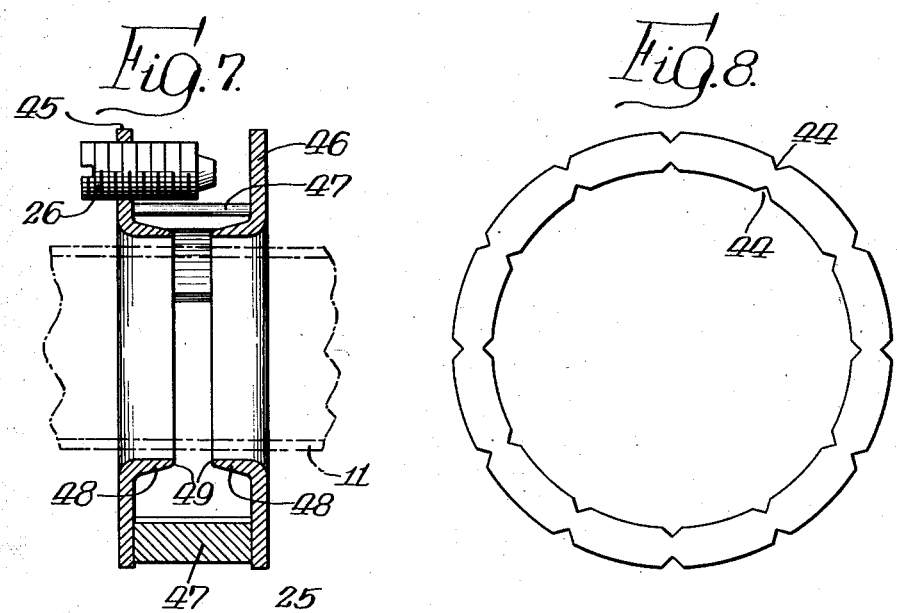
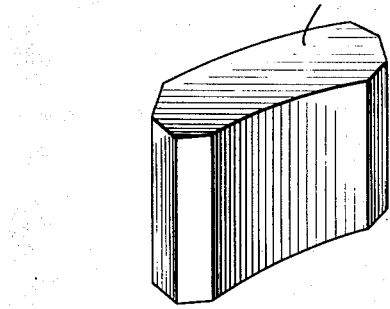
INVENTOR.
James P. Quam,
BY
Forman L. Mueller
Atty.

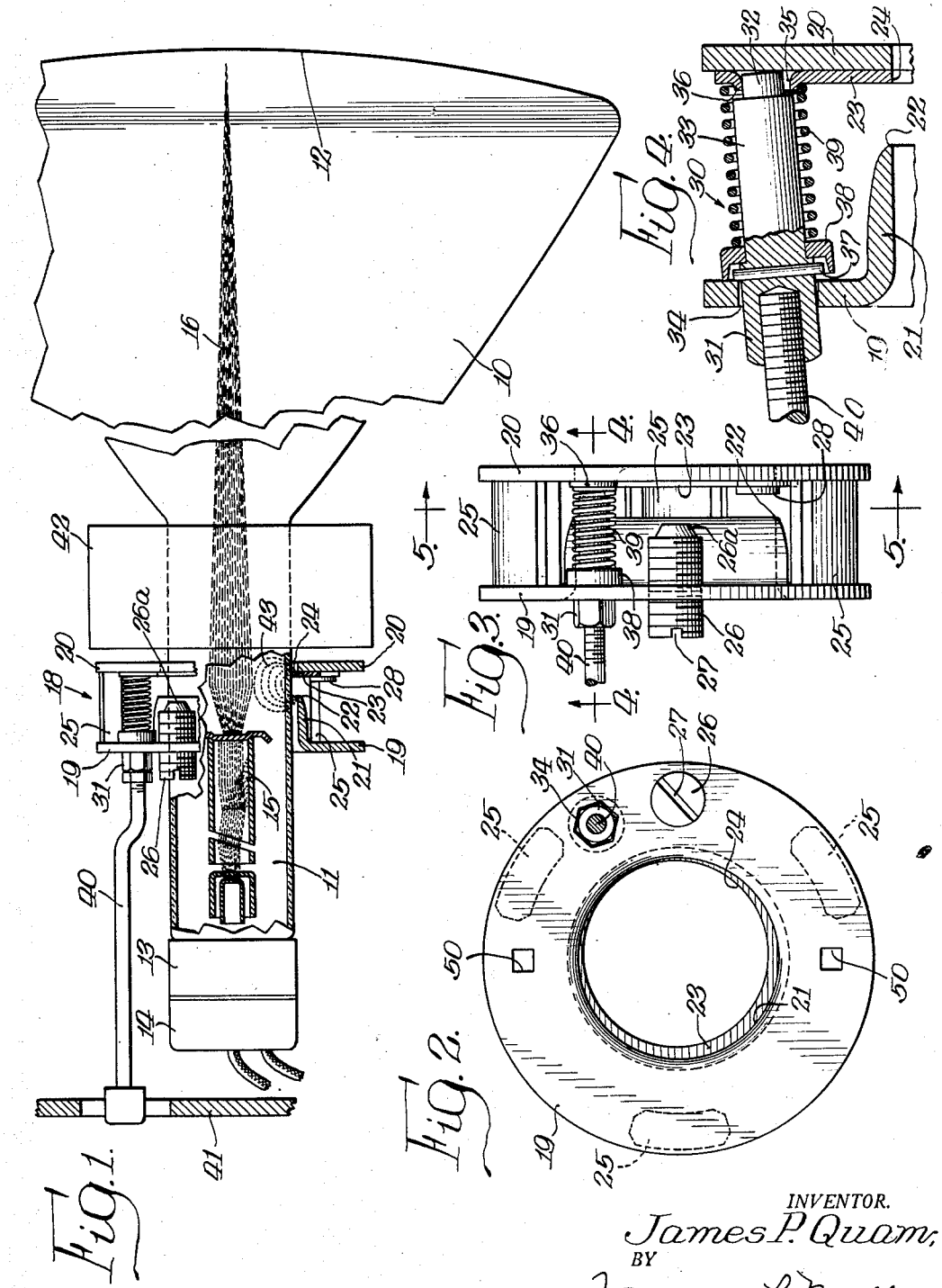

Patented Dec. 12, 1950

2,533,688

UNITED STATES PATENT OFFICE 2,533,688

FOCUSING DEVICE

James P. Quam, Chicago, Ill., assignor to Quam-Nichols Company, Chicago, Ill., a corporation of Illinois Application January 31, 1950, Serial No. 141,473

11 Claims. (Cl. 250—161)

This invention relates generally to a device for focussing an electron beam, and more particularly to a permanent magnetic focussing device for use with a cathode ray tube.

In the use of a cathode ray tube to reproduce an image on the screen thereof, the beam of electrons within the tube must be focussed so that the beam converges at the screen to form a relatively small spot thereon. Such focussing action is generally similar to the focussing of a beam of light rays by an optical lens. This focussing action may be accomplished by subjecting the beam of electrons to either an electrostatic or an electromagnetic field. The present invention is directed particularly to a device for producing an electromagnetic field about the neck of a cathode ray tube for focussing the beam which traverses the space within the neck.

The electromagnetic focussing field as aforementioned, may be produced either by a permanent magnet structure, by an electromagnet structure or by a combination of the two. Focussing devices utilizing electromagnets are objectionable in that an external source of power is required and considerable heat is produced in the coil of the electromagnet. Accordingly the present invention is directed to a permanent magnet focussing device and is an improvement of the structure disclosed and claimed in my copending application, Serial No. 95,731, filed May 27, 1949, title: Focussing Device.

The focussing structure must afford some adjustment so that the intensity of the field may be controlled to accurately control the focussing effect. Further, it is desired that the structure be designed so that the field may be shifted transversely of the beam for centering the beam with respect to the screen of the cathode ray tube. These adjustments of the field should preferably be accomplished without changing the position along the tube neck at which the field is applied or otherwise effecting the application of the field to the beam as such action would make the adjustments unduly complicated.

It is, therefore, an object of the present invention to provide an improved permanent magnet device for focussing the beam of a cathode ray tube.

Another object is to provide an improved magnetic focussing device which is adjustable so that the field thereof also serves to center the electron beam which is being focussed thereby.

A further object is to provide a permanent magnet focussing device for a cathode ray tube which is constructed and positioned with respect to the tube so that the field thereof produces the optimum effect.

A feature of this invention is the provision of a simple magnetic focussing device for a cathode ray tube having one pole face which is universally adjustable in a plane by a single control handle which may extend away from the device so that the field of the device can be shifted for centering the beam of the tube.

Another feature of this invention is the provision of a focussing device having spaced pole pieces forming an annular air gap therebetween, with one of the pole pieces including an adjustable centering shutter which forms one face of the air gap, and a universally movable control handle supported on the other pole piece for shifting the shutter and thereby providing a variable transverse component in the field in the air gap.

A further feature of this invention is the provision of a permanent magnet focussing device including a pair of annular pole pieces closely surrounding the neck of a cathode ray tube at least one of which has thin pole faces so that a concentrated field is produced which sprays out to penetrate the neck of the tube.

A still further feature of this invention is the provision of a permanent magnet focussing device including a pair of annular pole pieces closely surrounding the neck of a cathode ray tube at least one of which has thin pole faces so that a concentrated field is produced which sprays out to penetrate the neck of the tube.

A still further feature of this invention is the provision of a permanent magnet focussing device including a pair of annular pole pieces having permanent magnets therebetween formed by sections of an annular magnet with at least one of the pole pieces having an inturned rim at the inner diameter thereof to provide an air gap with the other pole piece.

Further objects and features will be apparent from a consideration of the following description when considered together with the accompanying drawings in which:

Fig. 1 illustrates the focussing device in accordance with the invention in operating position on a cathode ray tube, Fig. 2 is a front elevation view of the focussing device, Fig. 3 is a side elevation view of the focussing device, Fig. 4 is a cross sectional view along the lines 4—4 of Fig. 3;

Fig. 5 is a cross sectional view along the lines 5—5 of Fig. 3;

Fig. 6 is a front elevation view of the modified device;

Fig. 7 is a cross sectional view along the line 7—7 of Fig. 6;

Fig. 8 illustrates a ring magnet from which magnet sections may be broken, and

Fig. 9 illustrates one magnet section as used in the focussing device.

In practicing the invention there is provided a permanent magnet focussing device for a cathode ray tube including a pair of annular pole pieces made of material having low reluctance positioned about the neck of the tube. To provide a magnetic field between the pole pieces, a plurality of magnets are positioned therebetween. One of the pole pieces may include an adjustable centering shutter having a portion forming one face of an annular air gap in which a field is produced for focussing the beam of the tube. The shutter is supported for universal movement in a plane and is controlled by a single handle extending away from the device. The position of the centering shutter controls the transverse component of the field in the air gap and serves to shift the beam of the tube for centering the same. The other pole piece may include an inturned rim at the inner periphery thereof which forms the other face of the air gap, with the rim being drawn down to a relatively sharp edge adjacent the tube neck so that the field is concentrated and sprays out to penetrate the tube neck and produce the maximum focussing effect on the beam thereof. The magnets are arcuate and conform to the outer periphery of the pole pieces. They may be provided as sections broken from an annular magnet structure so that a plurality of sections may be cast at the same time to provide an inexpensive structure. For controlling the field in the air gap, shunting means may be provided as by a screw of low reluctance material threaded in one of the pole pieces and adjusted to a position adjacent the other pole pieces, whereby the reluctance of the shunt path can be varied to control the field in the air gap.

In Fig. 1 there is illustrated a cathode ray tube 10 having a neck portion 11 and a front face 12 on which may be provided a fluorescent surface. The tube may include a base 13 through which connections are made to the elements within the tube. A socket 14 may be connected to the base 13 for energizing the elements within the tube. The tube structure may be of standard construction and will not be described in detail. The structure includes an electron gun 15 for producing a beam of electrons 16.

The permanent magnet focussing device is indicated generally at 18 and includes annular spaced pole pieces 19 and 20 positioned about the neck 11 of the cathode ray tube. The pole piece 19 includes an inturned rim 21 which extends a substantial portion of the distance between the pole pieces. The rim 21 is rounded off or bevelled to provide a relatively narrow end or pole face 22. Secured to the pole piece 20 is an annular centering shutter which is adjustably positioned with respect to the pole piece 20. The shutter 23 has an inner edge 24 which is of smaller diameter than the opening in the pole piece 20 and which forms the second pole face of the air gap. A plurality of magnets 25 are provided between the pole pieces 19 and 20 so that a flux is provided which passes through the annular air gap between the pole faces 22 and 24 and which is highly concentrated in this gap. For adjusting the strength of the field in the air gap, a magnetic shunt is provided which is formed by the screw 26 threaded in the pole piece 19 and extending adjacent to the pole piece 20. The screw 26 has a reduced end 26a to provide a finer adjustment of the field and includes a screw driver slot 27 therein to facilitate adjustment of the focussing field. A plurality of shunting screws may be provided between the pole pieces to provide a greater variation in the field produced by the device.

The structure and operation of the centering shutter of the focussing device is best shown in Figs. 4 and 5. The shutter 23 is positioned on the inside surface of the pole piece 20 and is secured thereto by the rivet 28 which extends through slot 29 in the shutter. The shutter is supported at its opposite side by the adjusting mechanism therefor indicated generally by reference numeral 30. As stated above the shutter has an opening therein of smaller diameter than the opening in the pole piece 20. The adjusting mechanism 30 includes a stud having a hexagon shaped head 31, a reduced end portion 32, and an intermediate body portion 33. The hexagon head 31 is positioned in a hexagon shaped opening 34 in the pole piece 19 which is somewhat larger than the head so that the head can move relatively freely therein. Universal movement of the head 31 of the stud in the limited orbit permitted by the opening 34 provides movement of the end portion 32 of the stud in all directions in a much larger orbit. The end portion 32 is positioned in an opening 35 in the shutter having a rim 36 formed thereabout so that the end 32 of the stud cannot easily slip out of the opening. To prevent withdrawal of the stud through the opening 34, pin 37 is provided in the head 31. A cup-shaped washer 38 is provided about the stud with the lip thereon covering the pin 37 and bearing against the pole piece 19. Positioned about the intermediate portion 33 of the stud is a spring 39 which bears against the washer 38 and the shutter 23. The spring holds the shutter against the pole piece 20 and provides a tension for holding the adjusting stud in position. The head 31 of the stud has a threaded recess for receiving a control handle 40. A locknut may be provided to prevent the handle 40 from becoming loose in the stud. When the focussing device is used with the picture tube of a television receiver, the handle 40 may extend at the rear of the cabinet and be used for centering the picture on the screen of the tube. As indicated in Fig. 1, the control handle is offset to clear the tube socket and extends into an opening in the rear wall 41 of the housing for the cathode ray tube.

An annular air gap is therefore formed between the face 22 of the pole piece 19 and the edge 24 of centering shutter 23. The field produced in this air gap by the magnets is highly concentrated by the small pole face 22 and spreads out to thereby penetrate the neck of the tube. While shifting the position of the centering shutter 23 a component of flux transverse to the beam 16 is produced which is effective to shift the beam. As described above, the centering shutter 23 is movable universally within its plane by swinging the control handle 40. The opening in the shutter 23 can thereby be shifted in any desired direction with respect to the opening in the pole piece to thereby shift the position of the beam.

The centering action provided by the shutter eliminates the need for centering currents through the deflection coils as has been customary. The effective centering thus provided also results in other advantages. In the past it has been necessary that the mounting means for permanent magnet focussing devices be very carefully designed as otherwise the magnetic action of the mounting devices cause undesired deflection of the beam. The centering action provided by the shutter may be used to compensate for any such deflection caused by the mounting means. Movement of the shunting screw for controlling the strength of the field in the focussing device also has a slight effect of shifting the position of the beam since the action of the shunt results in a stronger field on one side of the device than on the other. This shifting is easily compensated for by movement of the centering shutter.

In addition to electrical advantages, the centering shutter has a mechanical advantage in that it reduces the danger of tube breakage during assembly. This results as the shutter will give if engaged by the neck of the tube so that such engagement is not as liable to cause breakage of the tube. The centering shutter has been found to provide substantial shift of the beam without producing neck shadows which result in certain other structures in which the beam is centered by shifting the focussing device.

As shown in Figs. 2 and 9, the magnets 25 are sections of an annular ring having substantially the same outer diameter as the outer diameter of the pole pieces. This provides a neat construction, and one in which the magnets may have substantial cross section and still be spaced from the pole faces so that the flux produced by the magnets is substantially uniformly distributed around the air gap. A plurality of magnet sections can be cast simultaneously as a ring to reduce the cost thereof. Such a ring is shown in Fig. 8 with the ring having notches 44 on the opposite sides thereof so that the sections can be easily broken apart.

Positioned on the neck 11 of the cathode tube 10 there is also provided a deflection yoke 42. This yoke includes windings through which currents are passed to provide fields for deflecting the electron beam. The yoke 42 must have considerable size to provide sufficient fields for producing the required deflection. In constructing cathode ray tubes of the type disclosed it is desired that the tubes be of such configuration that they can be housed in a cabinet of minimum size. Accordingly, the neck 11 of the tube is made as short as possible to provide the electron gun structure connected therein and to permit the required focussing and deflection of the electron beam. In the construction shown in Fig. 1 the deflection yoke 42 is of such size to occupy a large portion of the space between the end of the electron gun and the flaring portion of the tube. The focussing device 18 is so constructed that the field produced thereby is positioned at one end of the device and, therefore, is in the region where the effect of the field is greatest. The structure is of such dimensions that the pole pieces quite closely surround the neck 11 of the tube and the field produced thereby extends within the neck of the tube to have the required focussing effect.

To produce the focussing effect on the electron beam 16, the field produced in the air gap must extend within the neck of the tube and into the space traversed by the beam. To provide the required field within the tube, with a minimum magnet structure, the pole faces forming the air gap are reduced to relatively sharp edges which are positioned on the inside diameter or adjacent the tube neck. The field in the air gap is, therefore, highly concentrated and tends to spread or spray out. This causes the field to penetrate the neck of the tube and thereby enter the space traversed by the electron beam 16 to provide the desired focussing effect. This is illustrated by the flux lines 43 in Fig. 1.

In Figs. 6 and 7 there is illustrated a second embodiment of the invention which is generally similar to that illustrated in Figs. 1, 2 and 3, with the exception that the air gap is centered with respect to the pole pieces. The pole pieces 45 and 46 are secured together by magnets 47 which may be identical to the magnets 25 of Figs. 2 and 7. The pole pieces 45 and 46 are substantially identical with inturned rims 48 which are tapered to provide relatively thin pole surfaces 49 at the inside edges. This results in a concentration of the flux very close to the neck of the tube so that the field sprays out and permeates the neck, and serves to focus the electron beam therein. Such a symmetrical structure having a centrally positioned air gap may be preferred when it is possible to use this structure as the fringing fields extending from the pole pieces proper are a minimum in such a structure. However, as pointed out above, in some applications it is not possible to use such a symmetrical structure and a device as disclosed in Figs. 1, 2 and 3 will be required. The pole pieces 45 and 46 may be off center with respect to each other to provide a slight fixed centering action if this is desired.

Focussing devices in accordance with the invention have been found highly successful in actual use. The following dimensions have been used in a commercial embodiment of a structure as illustrated in Figs. 1 to 5, for a 10" cathode ray tube:

Pole pieces:
    Outside diameter, 3⅜"
    Diameter of opening, 1¾"
    Thickness, ⅛"
    Width of pole face 22, 1/32" or less
    Material—cold rolled steel
Centering shutter:
    Diameter of opening, 1⅝"
    Thickness, 1/16"
    Material—cold rolled steel
Air gap between pole pieces, 5/16"
Shunting screw—cold roller steel, ½" diameter
Permanent magnets—Alnico #5, ⅞" long. Cross section approximately 5/16 x 13/16"

Certain of these dimensions are interrelated and therefore a change in one would call for a corresponding change in the others. The dimensions required will, of course, depend upon the cathode ray tube structure and size.

Permanent magnet focussing devices as described have been found to be highly satisfactory in use. Such devices are complete systems requiring no external source of power and, therefore, the load required of the power supply is reduced as compared with an electromagnetic focussing device. The field produced by the device is constant and does not fluctuate with power supply variations so that the focussing effect is completely stable. The air gap is positioned close to the neck of the tube and the pole faces are shaped so that the field produced thereby sprays from the narrow pole faces and thus penetrates the tube so that the effect on the electron beam is optimum. A slight clearance between the focussing device and the tube neck is required to allow for variations in the diameter of the tube neck, and to permit action of the centering shutter. The reduced end of the shunting screw provides a fine adjustment of the field and still provides a large range of adjustment so that the desired focussing operation can be provided.

The focussing device described is of inexpensive construction sinces the pole pieces may be drawn or punched from sheet material, and the magnets made as a ring casting with a plurality of magnets being cast at one time. The pole pieces may be formed to provide the restricted pole faces in the original drawing or punching operation and/or may be machined to further provide the desired shape. The magnets and pole pieces may be secured together by immersion in a solder bath, or in any other suitable way. The complete focussing device is smaller and lighter than electromagnetic devices or combined permanent and electromagnetic devices which are available for use with the same tube size. Openings 50 may be provided in the pole pieces to receive means for supporting the devices.

While certain embodiments of the focussing device in accordance with the invention have been illustrated, it is obvious that various changes and modifications can be made therein without departing from the intended scope of the invention as defined in the appended claims.

I claim:

1. A device for focussing an electron beam and for shifting the position thereof comprising, a magnetic structure including first and second spaced pole pieces made of material of low reluctance and having relatively large beam receiving openings therein, a centering plate made of material of low reluctance slidably supported on said first pole piece on the side thereof toward said second pole piece, said centering plate having an opening therein for receiving said beam which is smaller than said opening in said first pole piece, said second pole piece having a substantially flat main portion and an integral rim portion at said opening therein extending toward said centering member and forming an annular air gap therewith, said main portion of said second pole piece having a small opening therein, and a single control handle for said centering plate having a first portion positioned in said small opening in said second pole piece for limited universal movement with respect thereto, said handle having a second portion engaging said centering plate for shifting said plate in any desired direction in its plane for shifting said beam with said second portion moving through a wider area than does said first portion and with said single control handle accomplishing all of the shiftability of said centering plate.

2. A device for focussing an electron beam and for shifting the position thereof comprising, a magnetic structure including first and second spaced pole pieces having relatively large beam receiving openings therein, a centering plate slidably supported on said first pole piece on the side thereof toward said second pole piece, said centering plate being of elongated configuration having a relatively large center opening therein, said centering plate having a longitudinal slot on one side of said center opening and a relatively small opening on the other side of said center opening, said center opening being smaller than said beam receiving opening of said first pole piece, a pin secured to said first pole piece and positioned in said slot in said centering plate, said second pole piece having a substantially flat main portion and an integral rim portion at said opening therein forming an annular air gap with said centering plate, said main portion of said second pole piece having a relatively small opening therein, and a single control handle for said centering plate having a portion positioned in said small opening in said second pole piece for limited universal movement with respect thereto, said single handle having an end thereof positioned in said small opening in said centering plate for shifting said plate in any desired direction in its plane for shifting said beam with said single control handle accomplishing all of the shiftability of said centering plate.

3. A magnetic structure for focussing a beam of electrons including in combination, a pair of pole pieces, each having a body portion with a beam receiving opening therein, and with said body portions being spaced apart from one another, permanent magnet means extending between said body portions of said pole pieces, said pole pieces each having a part on the inward side thereof at said opening, said parts providing an annular air gap therebetween having a substantially constant length less than half the spacing between said body portions of said pole pieces, said inward part of one of said pole pieces having a bevelled annular edge as a pole face for providing a concentrated field in said air gap, said inward part of the other one of said pole pieces comprising a member having an opening therein substantially coextensive with the beam receiving openings of the pole pieces, with said member being adjustable with respect to said body portion of said other one pole piece for shifting the field in the air gap in a direction transverse to the axis of said annular air gap, and adjustable means on one of said pole pieces for providing a magnetic path between said pole pieces to adjust the strength of the magnetic field in said annular air gap, said permanent magnet means and said adjustable means being magnetically coupled to said pole pieces and being radially spaced from said body portion openings so that the magnetic field is distributed through said pole pieces and the field in said annular air gap is substantially uniform.

4. A magnetic structure for focussing a beam of electrons including in combination, a pair of pole pieces, each having a body portion with a beam receiving opening therein, and with said body portions being spaced apart from one another, permanent magnet means extending between said body portions of said pole pieces and magnetically coupled thereto, and means for holding said pole pieces and said permanent magnet means in assembled relation, said pole pieces each having a part on the inward side thereof at said opening, said parts providing an annular air gap therebetween having a substantially constant length of the order of one-third the spacing between said body portions of said pole pieces, said inward part of one of said pole pieces having a bevelled annular edge as a pole face for providing a concentrated field in said air gap, said inward part of the other one of said pole pieces comprising a member having an opening therein substantially coextensive with the beam receiving openings of the pole pieces, with said member being shiftable with respect to said body portion of the other one of said pole pieces for shifting the field in the air gap in a direction transverse to the axis of said annular air gap, and a single handle means connected to said member, with said single handle means being movable to accomplish all of the shiftability of said member.

5. A magnetic structure for focussing a beam of electrons including in combination, a pair of pole pieces each having a body portion with a beam receiving opening therein, and with said body portions being spaced apart from one another, permanent magnet means extending between said body portions of said pole pieces, one of said pole pieces having a part on the inward side thereof at said opening providing an air gap with the other one of said pole pieces, said part on the inward side of said one pole piece having a beam-receiving opening therein and including a portion operatively connected to said one pole piece for mounting said part on said first pole piece in slidable relation therewith, single handle means having a portion engaging said part of said one pole piece for shifting the same and thereby shifting the field in the air gap in a direction transverse to said air gap, and adjustable means on one of said pole pieces for providing a shunt magnetic path between said pole pieces to adjust the strength of the magnetic field in said air gap, said permanent magnet means and said adjustable means being magnetically coupled to said pole piece and being radially spaced from said body portion openings so that the magnetic field is distributed through said pole piece and the field in said air gap is substantially uniform, with said single handle means being movable to accomplish all of the shiftability of said part of said one pole piece.

6. A magnetic structure for focussing a beam of electrons including in combination, first and second pole pieces each having a body portion with a beam receiving opening therein, and with said body portions being spaced apart from one another, permanent magnet means extending between said body portions of said pole pieces and magnetically coupled thereto, said pole pieces each having a part on the inward side thereof at said opening, said parts providing an air gap therebetween having a substantially constant length less than half the spacing between said body portion of said pole pieces, said inward part of said first pole piece having a bevelled edge as a pole face for providing a concentrated field in said air gap, said inward part of said second pole piece being shiftable with respect to said body portion of said second pole piece for shifting the field in the air gap in a direction transverse to the direction of said air gap, and single control handle means for moving said inward part of said second pole piece, said latter means having a first portion operatively connected to said first pole piece for limited substantially universal movement with respect thereto, said single control handle means also having an end portion thereof engaging a portion of said inward part of said second pole piece and moving upon movement of said first portion for shiftably moving said inward part, and with the area of movement of said first portion of said handle means at said first pole piece during a control operation being less than the possible area of movement of the end portion of said single control handle means.

7. A device for focussing an electron beam and for shifting the position thereof including in combination, a magnetic structure including first and second spaced pole pieces having beam receiving openings therein, permanent magnet means extending between and magnetically coupled to said pole pieces, a centering plate slidably supported on said first pole piece on the side thereof toward said second pole piece and operatively connected thereto at one part, said centering plate having a beam receiving opening therein and being movable in a plane, said second pole piece having a second opening therein, and control handle means for said centering plate having a first portion positioned in said second opening in said second pole piece for movement in a limited orbit therein, said control handle means also having an end portion thereof engaging a portion of said centering plate which is spaced from said one part of said plate, said control handle means upon a control movement thereof being movable at said first portion in an orbit limited by said second opening in said second pole piece and moving simultaneously at said end portion in an orbit greater than said limited orbit to shift said centering plate engaged by said end portion in any desired direction in its plane to shift the magnetic field adjacent said centering plate.

8. A device for focussing an electron beam and for shifting the position thereof including in combination, a magnetic structure including first and second spaced pole pieces having beam receiving openings therein, permanent magnet means extending between and magnetically coupled to said pole pieces, a centering member having a beam receiving opening therein at least partially coextensive with said beam receiving opening of said first pole piece and being slidably supported on said first pole piece on the side thereof toward said second pole piece for movement in a single plane, said centering member having a connecting portion to one side of said beam receiving opening therein operatively connected to said first pole piece for mounting said centering member on said first pole piece in slidable relation therewith, and single control handle means for said centering member extending through an aperture in said second pole piece and having an end portion thereof engaging a portion of said centering member on the side of said beam receiving opening therein substantially opposite to said connecting portion thereof, with said single control handle means upon a control movement thereof moving in the aperture in said second pole piece and providing direct movement at its end portion to thereby directly shift said centering member in any desired direction in its plane and correspondingly shift the magnetic field between said centering member and said second pole piece.

9. A device for focussing an electron beam and for shifting the position thereof including in combination, a magnetic structure including first and second spaced pole pieces each having a beam receiving opening therein, permanent magnet means extending between and magnetically coupled to said pole pieces, a centering plate slidably supported on one of said pole pieces on the side thereof toward the other of said pole pieces, said centering plate having a beam receiving opening therein and having connecting means on one side of said opening, said opening of said centering plate being at least partially coextensive with said beam receiving openings in said pole pieces, one of said pole pieces including means acting together with said connecting means on said centering plate for maintaining said centering plate on said one of said pole pieces in slidable relation therewith for movement in a single plane, and single control handle means for said centering plate operatively connected to a pole piece for limited substantially universal movement with respect thereto, said single control handle means having a portion thereof engaging a portion of said centering plate which is spaced from said centering plate connecting means for shifting said centering plate in any direction in its plane to thereby shift the magnetic field between said centering plate and its supporting pole piece, and with said portion of said single control handle means as the centering plate being movable in a greater area than the area of movement of said handle means at said operative connection of said handle means and a pole piece.

10. A device for focussing an electron beam and for shifting the position thereof including in combination, a magnetic structure including first and second spaced apart pole pieces each having a beam receiving opening therein, permanent magnet means extending between and magnetically coupled to said pole pieces, a centering plate on said first pole piece having an opening therein, said centering plate being operatively connected to said first pole piece and maintained thereon in pivotal and slidable relation therewith, said second pole piece having a second opening therein, control handle means for said centering plate having a portion positioned in said second opening in said second pole piece for movement in a limited orbit therein, said handle means having an end portion thereof engaging a portion of said centering plate, said control handle means being movable to move said end portion thereof through an orbit greater than the limited orbit provided by said second opening in said second pole piece to thereby shift said centering plate in any desired direction in its plane for shifting the magnetic field adjacent said centering plate, and spring means about said handle means between said second pole piece and said centering plate and applying resilient pressure therebetween for holding said centering plate against said first pole piece.

11. A device for focussing an electron beam and for shifting the position thereof including in combination, a magnetic structure including first and second spaced apart pole pieces each having a beam receiving opening therein, permanent magnet means extending between and magnetically coupled to said pole pieces, a centering member on said first pole piece on the side thereof toward said second pole piece and having an opening therein at least partially coextensive with the beam receiving opening in said first pole piece, said centering member having a connecting portion on one side of the opening therein operatively connected to said first pole piece for mounting said centering member on said first pole piece in pivotal and slidable relation therewith, resilient means between said second pole piece and said centering member for applying resilient pressure therebetween so that said centering member bears firmly against said first pole piece, and single control handle means for said centering member supported for limited universal movement with respect to said second pole piece and having a portion thereof engaging a portion of said centering member spaced from said connecting portion thereof, with movement of said single control handle means alone accomplishing the entire shifting of said centering member in any desired direction in its plane to thereby shift the magnetic field between said centering member and said second pole piece.

JAMES P. QUAM.

REFERENCES CITED

The following references are of record in the file of this patent:

UNITED STATES PATENTS

| Number | Name | Date |
|---|---|---|
| 2,102,421 | Kuehni | Dec. 14, 1937 |
| 2,200,039 | Nicoll | May 7, 1940 |
| 2,212,206 | Holst et al. | Aug. 20, 1940 |
| 2,219,193 | Mynall | Oct. 22, 1940 |
| 2,224,933 | Schlesinger | Dec. 17, 1940 |
| 2,234,720 | De Tar | Mar. 11, 1941 |
| 2,305,761 | Borries et al. | Dec. 22, 1942 |
| 2,336,837 | Bedford | Dec. 14, 1943 |
| 2,416,687 | Fry | Mar. 4, 1947 |
| 2,418,487 | Sproul | Apr. 8, 1947 |
| 2,431,077 | Poch | Nov. 18, 1947 |
| 2,433,682 | Bradley | Dec. 30, 1947 |
| 2,440,403 | Jackson | Apr. 27, 1948 |
| 2,442,975 | Grundmann | June 8, 1948 |
| 2,443,973 | Asling | June 22, 1948 |
| 2,456,399 | Gethmann | Dec. 14, 1948 |
| 2,494,459 | Torsch | Jan. 10, 1950 |

FOREIGN PATENTS

| Number | Country | Date |
|---|---|---|
| 472,165 | Great Britain | Sept. 13, 1937 |
| 521,439 | Great Britain | May 22, 1940 |
| 597,255 | Great Britain | Jan. 21, 1948 |
| 615,553 | Great Britain | Jan. 7, 1949 |
| 848,180 | France | July 17, 1939 |
| 871,483 | France | Apr. 27, 1942 |